(No Model.)
O. OHLSSON.
CENTRIFUGAL CREAMER.
No. 539,399. Patented May 14, 1895.
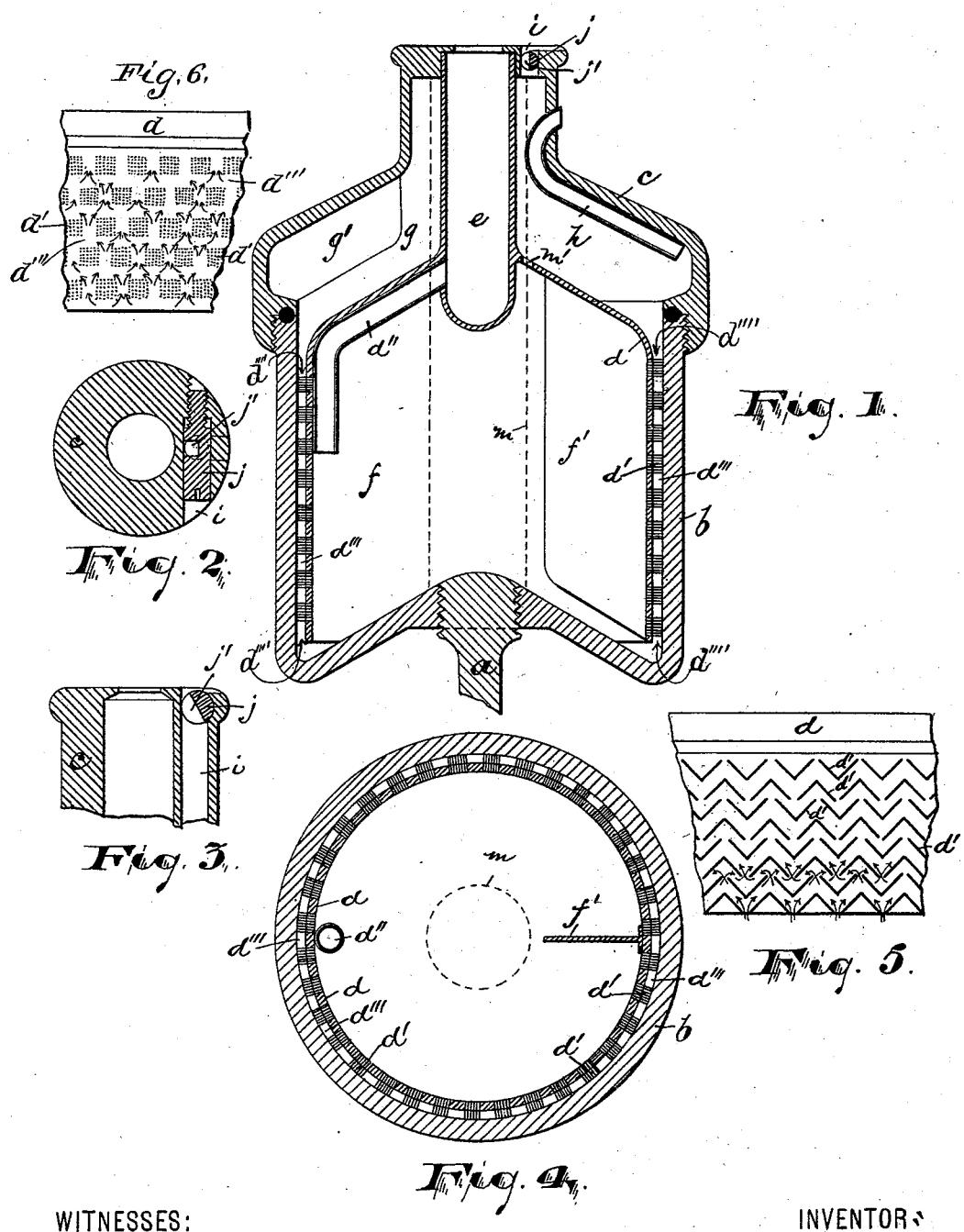
WITNESSES:
Robert Sollberger
Louisa Browne
INVENTOR
Olof Ohlsson,
BY Drake & Co. ATTY'S.

UNITED STATES PATENT OFFICE.

OLOF OHLSSON, OF NEWARK, NEW JERSEY.

CENTRIFUGAL CREAMER.

SPECIFICATION forming part of Letters Patent No. 539,399, dated May 14, 1895.

Application filed June 20, 1894. Serial No. 515,106. (No model.)

*To all whom it may concern:*

Be it known that I, OLOF OHLSSON, a citizen of the United States, residing at Newark, in the county of Essex and State of New Jersey, have invented certain new and useful Improvements in Centrifugal Creamers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Heretofore in the centrifugal creaming of milk various methods and devices have been invented (and some of them have been used in the art) to increase the skimming capacity and coincidently the closeness of the skimming for a given expenditure of power. To this end it has latterly been common to divide the milk occupying the liquid space of the bowl into numerous thin layers, laminæ or strata obliquely crossing the radial lines of the bowl (in which thin layers, laminæ or strata simultaneous but independent separation goes on) the separated cream from each of the thin layers moving directly and through an unobstructed central flow passage to the common cream outlet of the machine and the separated blue milk from each of the layers moving directly and through an unobstructed peripheral flow passage to the common blue milk outlet of the machine. It has also been suggested to guide the main milk body successively through a number of interior bowl chambers of various shapes, thereby retaining the milk longer in the bowl subject to the centrifugal action and at the same time subjecting the milk to that action in smaller individual bodies or masses. In all of these cases it is centrifugal action alone that is relied upon to accomplish the separation.

I have discovered that while simple centrifugal action is efficient to economically separate out from full milk into the form of cream a large proportion of the fat particles that the full milk contains, say ninety per cent. of those fat particles, yet it is not when used alone efficient to economically separate out the residual ten per cent.; and that in ordinary practice the separating out or skimming of the last ten per cent. of the fat particles actually delays and retards the whole operation to such a remarkable extent that the capacity for a given expenditure of power is reduced by attempting to take out the last ten per cent. almost one half. Thus a bowl which at normal rotative speed will skim six hundred pounds of full milk per hour, leaving ten per cent. of the fat in the blue milk, will at the same rotative speed skim only three hundred to three hundred and fifty pounds of full milk per hour, if the skimming is made approximately clean—that is to say, with the continuous expenditure of the same power from minute to minute it will take almost twice as long to skim the six hundred pounds approximately clean as it takes to skim it up to ninety per cent. of its fat particles; or, in other words, with the machine running at the same speed the rate of inflow of full milk which is permissible when skimming only ninety per cent. of the fat particles must be reduced almost one-half when it is desired to also skim the residual ten per cent. or approximately so. I do not intend these figures as exact measurements, but they will serve to illustrate what is the fact that enormous sacrifices in capacity are involved in forcing up even to a small extent the last percentages of fat particles that are separated or skimmed by a given machine and I believe this to apply generally to all existing centrifugal machines. I have further discovered that this characteristic of existing creaming methods and devices is due to a difference (as I conclude, in size or weight) in the fat particles themselves, the great majority of the fat particles in ordinary full milk being of such a character as to readily float out or separate out from the blue milk under intense centrifugal action while a small percentage, as say ten per cent. or thereabout, of the fat particles are of such a character as to be separated (even by the most intense centrifugal force) only with great difficulty and slowly from the blue milk. If it is a matter of the relative size of the fat particles, as seems to be indicated by the phenomena observed, it is readily explicable, for the large particles will, simply because of their greater size, be more pointedly contrasted in gravity or weight with blue milk particles or masses of equal size and so the two will respond to the centrifugal action with sufficient difference to separate them readily from each other; whereas the small fat particles may be so small that the difference between their gravity or weight and that of a blue milk particle or mass of equal size is not enough to bring about their separation except slowly. Moreover the forces of adhesion or cohesion may hold the small fat particles more tightly to the small particles of blue milk or serum than they hold the large fat particles to the large particles of blue milk. On the other hand the less readily floatable or separable particles or some of them may be of less readily floatable or separable because of some peculiarity in the molecular intermixture or entrapping of those fat particles in or with the blue milk particles, or of the latter in or with the former, making, for instance, perhaps sponge-like masses of the fat particles greater in specific gravity as masses by reason of the blue milk entrapped in them than more concentrated masses of those same fat particles would be. I have further discovered that the separation by centrifugal action of these small or less readily floatable or separable particles of fat may be greatly facilitated and that this can be brought about simultaneously with the continuous separation of the larger or more readily floatable or separable fat particles, the whole resulting in a centrifugal creaming or skimming of the full milk that is practically clean or complete and that is attained with a sustained capacity approximately equaling that with which existing machines and methods separate the larger or more readily floatable or separable fat particles, that is to say, when they leave ten per cent., more or less, of the fat in the blue milk. Thus in the case supposed above, the bowl whose normal capacity when skimming the fat approximately clean was three hundred to three hundred and fifty pounds and when skimming ninety per cent. of the fat was six hundred pounds would when employed so as to utilize and embody my discovery have a capacity of six hundred pounds when skimming clean and the skimming would be cleaner than in the first case. This extraordinary result I have attained by the use of the method herein set out and claimed, and by the use of appropriate apparatus carrying out the said method.

My invention consists of the method or process and of the apparatus herein set out and claimed.

The method or process involves, speaking generally, three steps, namely, first, a preliminary separation of the full milk in any desired form of separating chamber or chambers, this separation being attained by centrifugal action in any ordinary way and accomplishing, for the reasons set out above, the separation of the larger or more readily floatable or separable fat particles from the milk, the lighter and heavier products of this separation being conducted apart; secondly, an agitating of the partially skimmed milk, resulting, as I believe, in a coalescing or concentrating of the finer or less readily floatable or separable fat particles that remain in the separated blue milk as it comes from the first step of the process, into larger or more readily floatable or separable fat particles, and, thirdly, a final separation of the liquid as it comes from the second step of the process in any desired form of separating chamber or chambers and a conducting apart of the lighter and heavier separated ingredients. The cream resulting from the preliminary separation and that resulting from the final separation may be mingled together and delivered together from the apparatus or they may be separately delivered as desired.

In the first step of the process—the preliminary separation—any centrifugal process of separating cream from milk may be employed which continuously delivers the separated ingredients apart. It is the purpose of this step of the process to separate out the larger or more readily separable fat particles; and the full milk can be fed into the apparatus at such a rate of speed as results in the separation in this first step of the process of only such larger or more readily separable fat particles.

In the second step of the process—the agitating of the partially skimmed milk, involving probably the coalescing or concentrating of the finer or less readily floatable or separable fat particles retained in the heavier ingredient as it comes from the first step of the process into larger or lighter or more readily floatable or separable particles—any effective means of doing the work may be employed. I have found it effective to agitate the heavier ingredient, as it comes from the first step of the process, by forcing it while still under the influence of intense centrifugal action into repeated collisions with itself, training it into zig zag courses near the periphery of the bowl with diverging and converging currents and without opportunity for either its blue milk or its cream to permanently separate and escape apart, but forcing all to pursue together the same obstructed paths. I therefore prefer this particular method of carrying out the second step of my general process, although I do not wish to be limited to it in my broad claims for the general process. This second step of the general process may be carried out by apparatus of such capacity and under such conditions that the separated heavier ingredient resulting from the first step of the process is treated as rapidly as it is delivered from said first step, whereby the full rate of work or full capacity of the method or apparatus by which the first step is accomplished may be availed of continuously. An effective way of attaining this end is illustrated in the special form of apparatus shown in the drawings and described below.

The third step of the general process is intended to avail of the results achieved in the second step, that is to say, the centrifugal force now acts upon the liquid as it comes from the second step of the process under such conditions as to permit the separation of the now larger or more readily separable fat particles from the skim milk and their permanent segregation apart and their separate delivery from the apparatus. For this step any desired method or form of apparatus for the centrifugal creaming of milk may be employed. It should be of such capacity as to readily receive and dispose of the continuous stream of liquid, consisting of blue milk and of coalesced or concentrated or more readily floatable or separable fat particles, that comes from the second step of the general process.

Some convenient and effective forms of apparatus for carrying out my general process and invention in its preferred form are shown in the drawings, in which—

Figure 1 is a central vertical section of a separating bowl and co-operating parts. Fig. 2 is a horizontal section of the upper portion of the cover of the same. Fig. 3 is a vertical section of the same. Fig. 4 is a horizontal section taken through the body of the bowl of Fig. 1. Fig. 5 is an illustrative detail of a modification, and Fig. 6 is a detail of the bowl of Figs. 1 to 4.

$a$ is a rotary shaft carrying the bowl $b$, which bowl has a cover $c$.

$e$ and $d''$ constitute the inlets for full milk, which milk is subjected to centrifugal force in the separating chamber $f$, being kept in rotation by wing $f'$.

Within the bowl $b$ is a second and inner bowl $d$ concentric therewith, and, throughout the greater part of its height, closely adjacent at its outer periphery to the inner wall of the bowl $b$, at a uniform distance of say one eighth of an inch more or less in a bowl of the diameter of four or five inches, forming a thin peripheral annular chamber $d''''$, the agitating chamber. The inner bowl $d$ carries or is carried by the full milk inlets $e$ and $d''$ and the three parts are carried by the bowl $b$. The bowl $d$ is open at the bottom as shown and above it and outside of it but within the bowl $b$ and its cover $c$ is the final separating chamber $g$, having wing $g'$ to compel rotation. The bowl $d$ has a cream delivery $m'$ and the bowl $b$ and its cover $c$ have a cream delivery $i$ regulated by a screw $j$ cut away at $j'$, and a blue milk outlet $h$. In the thin peripheral agitating chamber $d''''$ between the outer and inner bowls where they are closely adjacent to each other are arranged close groups of pins $d'$, forming obstructions, the groups being staggered with respect to each other and having narrow spaces $d'''$ between the groups, as shown in Fig. 6, which is a face view of a number of such groups. The pins or obstructions extend radially outward from the wall of the inner bowl to the wall of the outer bowl.

$m$ is the general cream wall of the apparatus as a whole.

In place of the groups of pins $d'$ of Figs. 1 and 4 might be substituted other obstructions such as radial plates or ribs of various kinds extending from the outer wall of the inner bowl to the inner wall of the outer bowl and with openings so placed as to avoid direct flow passages for either blue milk or cream.

Fig. 5 shows V-shaped ribs overlapping each other in reverse and the arrows indicate the enforced tortuous movements and the diverging and converging currents of the liquid as it works up through the agitating chamber $d''''$ toward the final separating chamber $g$.

The process as it would be practiced in the particular apparatus of the drawings is as follows: The full milk is introduced continuously in a properly regulated manner through the inlet $e$ and into the separating chamber $f$, where separation of the more readily separable fat particles takes place under the influence of centrifugal force. The speed of inflow of the full milk into this separating chamber $f$ is by my process permitted to be so rapid that only the larger or more readily floatable or separable fat particles are separated in this separating chamber $f$, these fat particles gathering as a cream wall along the line $m$ and continuously discharging through the cream discharge $m'$, the smaller or less readily floatable or separable fat particles remaining in the partially skimmed milk which continuously discharges underneath the lower peripheral edge of the inner bowl $d$. This ends the first step of the process. The partially skimmed milk discharged from the separating chamber $f$ now moves upward in the thin peripheral agitating chamber $d''''$. In this movement it does not find direct flow passages to facilitate the same but on the contrary it meets with obstructions to its direct flow and is forced thereby into tortuous windings and is divided into currents that collide and divide and collide again. It does not find quiescent pockets from which separated fat particles are discharged apart from the blue milk, but on the contrary the conditions are such that the only escape for the fat particles is by being swept along with the blue milk, which sweeping along involves repeated collisions of these fat particles with each other and agitation of the liquid mass resulting, as seems probable, in the gradual coalescence or concentration of these fat particles into larger or more readily floatable or separable particles. To the extent that the cream particles separate (if they separate at all) in this agitating chamber $d''''$ under the intense centrifugal action there proceeding they gather against and among the obstructions and in eddies behind the obstructions and there become targets for the bombardment of the blue milk particles and of the fat particles carried along by the blue milk current and they are ultimately borne along on the general current having no other way of escape. The obstructions and passage ways are preferably so arranged as to produce the maximum of mechanical collisions and agitations (and so, as seems probable, of coalescence or concentration) of the fat particles consistent with the required rapid movement and escape of the general body of liquid. This ends the second step of the process. The liquid is now delivered into the final separating chamber $g$, where it now readily separates into its lighter and heavier ingredients, the fat particles which resisted the separating action of the centrifugal force in the preliminary separating chamber $f$ readily yielding to it in the final separating chamber $g$, and this because of the effect upon them of the agitation, and so of the coalescing or concentrating or lightening action of the second step of the process. The separated cream gathers near the center of the chamber $g$, unites with the body of cream rising from chamber $f$ through $m'$ and the discharge is at $i$. The separated blue milk is discharged through the outlet conduit $h$.

The broad invention is irrespective of any particular apparatus and may be carried out and embodied in many different forms of apparatus. For instance, in place of the preliminary separating bowl or chamber $f$ any other kind of separating bowl or chamber may be used, as for example one with numerous partitions and numerous thin milk layers, like the so-called Alpha bowls, or any other form of bowl might be used, either any bowl that is known now or any bowl that may hereafter be invented, provided its operation is to separate full milk by centrifugal action and deliver the separated ingredients apart and further provided its operation is not inconsistent with the other steps of my process. The same thing practically is true also of the final separating chamber $g$. The agitating chamber $d''''$ may also be very greatly varied in form or character without departing from the invention. It is only necessary that the escaping heavier ingredient as it comes from the first step of the process shall be mechanically agitated sufficiently to substantially coalesce or concentrate or lighten or otherwise prepare the small or less readily floatable and separable fat particles that it contains into larger or more readily floatable or separable fat particles, so that they shall in the third step of the process yield to the separating action of centrifugal force which they resisted in the first step of the process.

What I claim as new, and desire to secure by Letters Patent, is—

1. The herein described process of creaming milk which consists in first separating the more readily separable fat particles by centrifugal action, then agitating the partially skimmed milk while under centrifugal action by dividing the same into diverging and converging currents whereby the fat particles contained in such partially skimmed milk are prepared for the final separation, and finally separating these fat particles from the skim milk by centrifugal action.

2. The herein described process of creaming milk which consists in first separating the more readily separable fat particles by centrifugal action, then agitating the partially skimmed milk while under centrifugal action by dividing the same into diverging and converging currents whereby the fat particles contained in such partially skimmed milk are prepared for the final separation, and finally separating these fat particles from the skim milk by centrifugal action and discharging together the fat particles resulting from the two separations.

3. In a centrifugal separator, the combination, substantially as set forth, with a preliminary centrifugal separating chamber in which the full milk is subjected to a preliminary separation, of an agitating chamber which receives the partially skimmed milk from the preliminary chamber and prepares the fat particles contained in such partially skimmed milk for the final separation and a final centrifugal separating chamber which receives the liquid from the agitating chamber and in which the fat particles contained in such liquid are separated from the skim milk.

4. A centrifugal separator, substantially as set forth, provided with a preliminary centrifugal separating chamber in which the full milk is subjected to a preliminary separation, a centrifugal agitating chamber which receives the partially skimmed milk from the preliminary chamber and prepares the fat particles contained in such partially skimmed milk for the final separation, and a final centrifugal separating chamber which receives the liquid from the agitating chamber and in which the fat particles contained in such liquid are separated from the skim milk.

5. In a centrifugal separator, substantially as set forth, provided with a preliminary centrifugal separating chamber in which the full milk is subjected to a preliminary separation, an agitating chamber which receives the partially skimmed milk from the preliminary chamber and which is provided with obstructions whereby such partially skimmed milk is divided into diverging and converging currents, and a final centrifugal separating chamber which receives the liquid from the agitating chamber and in which the fat particles contained in such liquid are separated from the skim milk.

6. In a centrifugal separator, substantially as set forth, provided with a preliminary centrifugal separating chamber in which the full milk is subjected to a preliminary separation, a centrifugal agitating chamber which receives the partially skimmed milk from the preliminary chamber and which is provided with obstructions whereby such partially skimmed milk is divided into diverging and converging currents, and a final centrifugal separating chamber which receives the liquid from the agitating chamber and in which the fat particles contained in such liquid are separated from the skim milk.

7. A centrifugal creaming bowl having suitable inlet and outlet conduits and suitable driving mechanism, and provided with a preliminary separating chamber in which the full milk is subjected to a preliminary separation, a peripheral agitating chamber which receives the partially skimmed milk from the preliminary chamber and prepares the fat particles contained in such partially skimmed milk for the final separation, and a final separating chamber which receives the liquid from the agitating chamber and in which the fat particles contained in such liquid are separated from the skim milk, substantially as shown and described.

8. A centrifugal creaming bowl having suitable inlet and outlet conduits and suitable driving mechanism, and provided with a preliminary separating chamber in which the full milk is subjected to a preliminary separation, a peripheral agitating chamber which receives the partially skimmed milk from the preliminary chamber and which is provided with obstructions whereby such partially skimmed milk is divided into diverging and converging currents, and a final separating chamber which receives the liquid from the agitating chamber and in which the fat particles contained in such liquid are separated from the skim milk, substantially as shown and described.

9. A centrifugal creaming bowl having suitable inlet and outlet conduits and suitable driving mechanism, and provided with a preliminary separating chamber in which the full milk is subjected to a preliminary separation, a thin peripheral agitating chamber which receives the partially skimmed milk from the preliminary chamber and prepares the fat particles contained in such partially skimmed milk for the final separation, and a final separating chamber which receives the liquid from the agitating chamber and in which the fat particles contained in such liquid are separated from the skim milk, substantially as shown and described.

10. A centrifugal creaming bowl having suitable inlet and outlet conduits and suitable driving mechanism, and provided with a preliminary separating chamber in which the full milk is subjected to a preliminary separation, a thin peripheral agitating chamber which receives the partially skimmed milk from the preliminary chamber and which is provided with obstructions whereby such partially skimmed milk is divided into diverging and converging currents, and a final separating chamber which receives the liquid from the agitating chamber and in which the fat particles contained in such liquid are separated from the skim milk, substantially as shown and described.

11. The bowl $b$ having suitable inlet and outlet conduits and driving mechanism, in combination with the interior concentric bowl $d$ forming an annular chamber $d''''$ provided with obstructions $d'$, substantially as and for the purposes set forth.

In testimony that I claim the foregoing I have hereunto set my hand this 19th day of June, 1894.

OLOF OHLSSON.

Witnesses:
CHARLES H. PELL,
LOUISA BROWNE.